(12) United States Patent
Wen et al.

(10) Patent No.: US 12,052,287 B2
(45) Date of Patent: Jul. 30, 2024

(54) SYSTEMS AND METHODS FOR SECURITY POLICY ORGANIZATION USING A DUAL BITMAP

(71) Applicant: Fortinet, Inc., Sunnyvale, CA (US)

(72) Inventors: Shushan Wen, Pleasant Hill, CA (US); John Cortes, Santa Clara, CA (US); Zhi Guo, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 325 days.

(21) Appl. No.: 17/683,919

(22) Filed: Mar. 1, 2022

(65) Prior Publication Data

US 2023/0283638 A1 Sep. 7, 2023

(51) Int. Cl.
*H04L 9/40* (2022.01)

(52) U.S. Cl.
CPC .......... *H04L 63/20* (2013.01); *H04L 63/0236* (2013.01); *H04L 63/104* (2013.01)

(58) Field of Classification Search
CPC ... H04L 63/20; H04L 63/0236; H04L 63/104; H04L 63/0263
See application file for complete search history.

(56) References Cited

U.S. PATENT DOCUMENTS

| | | | | |
|---|---|---|---|---|
| 5,951,651 A | * | 9/1999 | Lakshman | H04L 45/742 370/428 |
| 6,529,897 B1 | * | 3/2003 | Corl, Jr. | H04L 47/2425 |
| 6,925,572 B1 | * | 8/2005 | Amit | H04L 63/0245 713/162 |
| 7,227,842 B1 | * | 6/2007 | Ji | H04L 47/2441 370/235 |
| 8,027,330 B2 | * | 9/2011 | Paddon | H04L 63/0227 370/351 |
| 8,990,885 B2 | * | 3/2015 | Chang | G06F 9/45558 718/1 |
| 10,110,563 B1 | * | 10/2018 | Ganesh | H04L 63/20 |
| 2002/0009076 A1 | * | 1/2002 | Engbersen | H04L 45/74591 707/999.104 |
| 2002/0144156 A1 | * | 10/2002 | Copeland, III | H04L 63/0263 709/224 |
| 2003/0074458 A1 | * | 4/2003 | Gokhale | H04L 63/0263 709/230 |
| 2006/0221954 A1 | * | 10/2006 | Narayan | H04L 47/2441 370/389 |
| 2013/0019277 A1 | * | 1/2013 | Chang | H04L 63/0227 726/1 |
| 2015/0082370 A1 | * | 3/2015 | Jayaraman | H04L 63/20 726/1 |

OTHER PUBLICATIONS

Baboescu, Florin, and George Varghese. "Scalable packet classification." ACM SIGCOMM Computer Communication Review 31.4 (2001): 199-210. (Year: 2001).*

(Continued)

*Primary Examiner* — Theodore C Parsons
*Assistant Examiner* — Sameera Wickramasuriya
(74) *Attorney, Agent, or Firm* — Jaffery Watson Mendonsa & Hamilton LLP

(57) ABSTRACT

Systems, devices, and methods are discussed for classifying a number of security policies in relation to criteria for applying those security policies to yield a dual bitmap scheme representing a correlation between security policies and one or more criteria.

22 Claims, 8 Drawing Sheets

(56) References Cited

OTHER PUBLICATIONS

Kim, Sunghyun, and Heejo Lee. "Abnormal policy detection and correction using overlapping transition." IEICE Transactions on Information and Systems 93.5 (2010): 1053-1061. (Year: 2010).*
Gupta and N. McKeown. Classifying Packets with Hierarchical Intelligent Cuttings. IEEE Micro, 20(1):34-41, Feb. 2000.
Singh, F. Baboescu, G. Varghese, and J. Wang. Packet Classification using Multi-dimensional Cutting. In Proceedings of ACM SIGCOMM, 2003.
Vamanan, G. Voskuilen, and T. Vijaykumar. EffiCuts: Optimizing Packet Classification for Memory and Throughput. In Proceedings of ACM SIGCOMM, 2010.
W. Li and X. Li. HybridCuts: A Scheme Combining Decomposition and Cutting for Packet Classification. IEEE 21st Annual Symposium on High-Performance Interconnects, 2013.

\* cited by examiner

SYSTEMS AND METHODS FOR SECURITY POLICY ORGANIZATION USING A DUAL BITMAP

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2022, Fortinet, Inc.

FIELD

Embodiments discussed generally relate to systems and methods for characterizing packets received via a communication network, and more particularly to systems and methods for classifying a number of security policies in relation to criteria for applying those security policies to yield a dual bitmap scheme representing a correlation between security policies and one or more criteria.

BACKGROUND

Packet classification is a technical challenge in network gateway and firewall design. An enterprise-class networking device that supports policy searching uses the capability of classifying packets and mapping the classification results to corresponding policies. As the number of security policies increase and/or the complexity of the security policies increase, the costs in terms of both physical storage space and throughput latency increases. The negative impact on processing information packets can become unsustainable.

Hence, there exists a need in the art for improving correlation of received information packets and applicable security policies.

SUMMARY

Various embodiments provide systems and methods for classifying a number of security policies in relation to criteria for applying those security policies to yield a dual bitmap scheme representing a correlation between security policies and one or more criteria.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
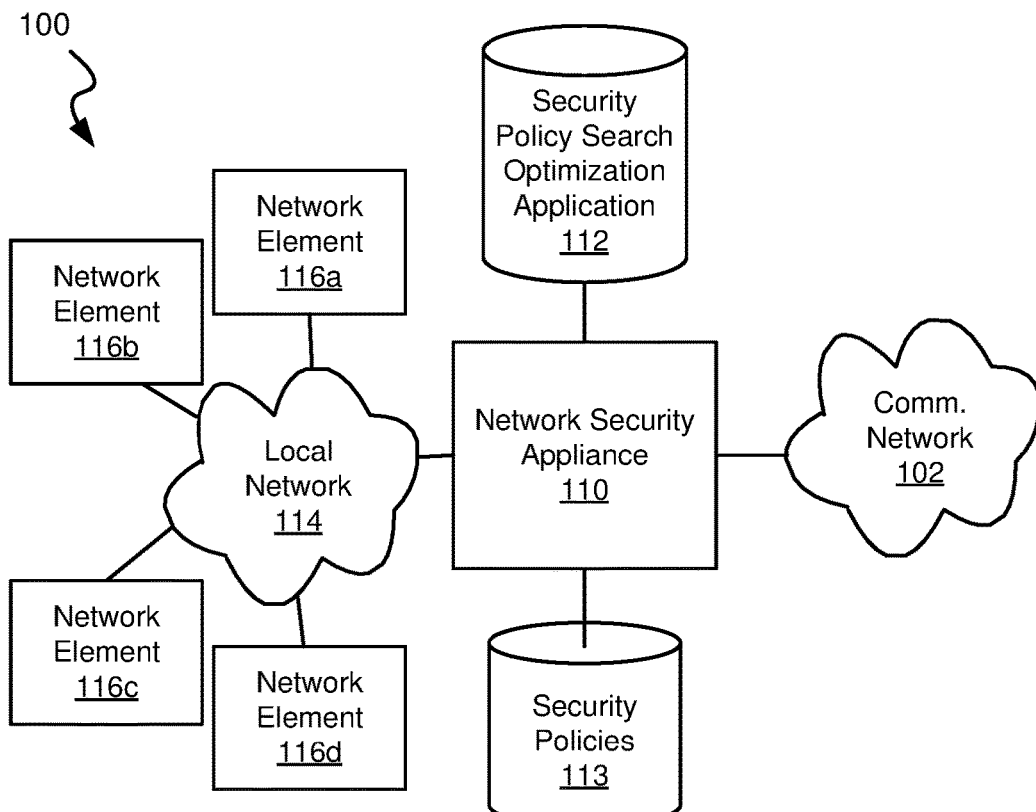
FIGS. 1A-1D illustrate a network architecture including a network security appliance executing a security policy search optimization application in accordance with some embodiments.

Various embodiments provide systems and methods for classifying a number of security policies in relation to criteria for applying those security policies to yield a dual bitmap scheme representing a correlation between security policies and one or more criteria.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. Such network security devices may include, but are not limited to, network firewall devices and/or network gateway devices. While there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Various embodiments provide methods for associating a set of security policies to dual bitmaps for policy correlation. The methods include: accessing, by a processing resource, at least a first security policy and a second security policy, where the first security policy includes at least a first application criteria and the second security policy includes at least a second application criteria; correlating, by the processing resource, the first application criteria to a first subset of segments represented by a first bitmap, and the second application criteria to a second subset of segments represented by the first bitmap; determining, by the processing resource, that at least two segments represented by the first bitmap are correlated to the first security policy; forming, by the processing resource, a second bitmap including bit locations that correspond to each of the at least two segments represented by the first bitmap; and associating, by the processing resource, only one of the bit locations in the second bitmap with a set of security policies for all of the at least two segments represented by the first bitmap that are correlated to the first security policy, where the set of security policies includes at least the first security policy.

In some instances of the aforementioned embodiments, the methods further include: identifying, by the processing resource, the second security policy as a common security policy based at least in part on the second application criteria; and associating, by the processing resource, a common bit location in the first bitmap with the second security policy. In some such instances, second application criteria extends into at least three segments represented by the first bitmap.

In various instances of the aforementioned embodiments, the first application criteria can be a single value, a value range, or multiple value ranges on source address, destination address, protocol, source port, destination port, or other additional field that represents a flow's feature. In some instances of the aforementioned embodiments, the at least two segments represented by the first bitmap determined to be correlated to the first security policy are continuous segments. In other instances, the at least two segments represented by the first bitmap determined to be correlated to the first security policy are non-contiguous segments.

In some instances of the aforementioned embodiments where the first subset of segments represented by the first bitmap and the second subset of segments represented by the first bitmap are along a dimension represented by the first bitmap, the method further includes: partitioning the first bitmap along the dimension to yield the segments represented by the first bitmap. In some such instances, the number of segments is selected to reduce a number of security policies extending beyond one segment.

In various instances of the aforementioned embodiments where the set of security policies is a first set of security policies, the first security policy includes a third application criteria, and the second security policy includes a fourth application criteria, the methods further include: correlating, by the processing resource, the third application criteria to a third subset of segments represented by a third bitmap, and the fourth application criteria to a fourth subset of segments represented by the third bitmap; determining, by the processing resource, that at least two segments represented by the third bitmap are correlated to the first security policy; forming, by the processing resource, a fourth bitmap including bit locations that correspond to each of the at least two segments represented by the third bitmap; and associating, by the processing resource, only one of the bit locations in the fourth bitmap with a second set of security policies for all of the at least two segments represented by the third bitmap that are correlated to the first security policy, where the second set of security policies includes at least the first security policy.

Other embodiments provide systems for correlating security policies to received information packets, the system includes: a processing resource and a non-transient computer readable medium coupled to the processing resource. The non-transient computer readable medium has stored therein instructions that when executed by the processing resource cause the processing resource to: access at least a first security policy and a second security policy, where the first security policy includes at least a first application criteria and the second security policy includes at least a second application criteria; correlate the first application criteria to a first subset of segments represented by a first bitmap, and the second application criteria to a second subset of segments represented by the first bitmap; determine that at least two segments represented by the first bitmap are correlated to the first security policy; form a second bitmap including bit locations that correspond to each of the at least two segments represented by the first bitmap; and associate only one of the bit locations in the second bitmap with a set of security policies for all of the at least two segments represented by the first bitmap that are correlated to the first security policy, wherein the set of security policies includes at least the first security policy.

Yet other embodiments provide non-transient computer readable media having stored therein instructions that when executed by the processing resource cause the processing resource to: access at least a first security policy and a second security policy, where the first security policy includes at least a first application criteria and the second security policy includes at least a second application criteria; correlate the first application criteria to a first subset of segments represented by a first bitmap, and the second application criteria to a second subset of segments represented by the first bitmap; determine that at least two segments represented by the first bitmap are correlated to the first security policy; form a second bitmap including bit locations that correspond to each of the at least two segments represented by the first bitmap; and associate only one of the bit locations in the second bitmap with a set of security policies for all of the at least two segments represented by the first bitmap that are correlated to the first security policy, where the set of security policies includes at least the first security policy.

Yet further embodiments provide methods for correlating security policies to received information. Such methods include: receiving, by a network appliance, an information packet via a communication network, where the information packet includes at least a first field and a second field; comparing, by the network appliance, the first field with a first range, where the first range corresponds to a first bit location in a first bitmap, and wherein the first bit location in the first bitmap indicates at least a first security policy; upon determining that the first field is within the first range, accessing, by the network appliance, a second bit location in a second bitmap, wherein the second bit location in the second bitmap corresponds to the first bit location in the first bitmap; and based at least in part upon the value in the second bit location in the second bitmap, identifying, by the network appliance, a set of security policies to be applied to the information packet.

In various instances of the aforementioned embodiments, the first bitmap is less than or equal to thirty-three (33) bits, and the second bitmap is less than or equal to thirty-two (32) bits. In one or more instances of the aforementioned embodiments, the network appliance is a network security appliance. In some such instances, the network security appliance is selected from a group consisting of: a network gateway server, and a network firewall.

In some instances of the aforementioned embodiments, identifying the set of security policies includes: determining, by the network security appliance, that the value in the second bit location of the second bitmap is different than a value in the first bit location in the first bitmap; and identifying, by the network security appliance, the set of security policies, where the set of security policies include those security policies indicated by a third bit position in the second bitmap. In other instances of the aforementioned embodiments, identifying the set of security policies includes: determining, by the network security appliance, that the value in the second bit location of the second bitmap is the same as a value in the first bit location in the first bitmap; and identifying, by the network security appliance, the set of security policies, where the set of security policies include those security policies indicated by the second bit position in the second bitmap.

In some instances of the aforementioned embodiments where the set of security policies is a first set of security policies, identifying the set of security policies is identifying the first set of security policies, and wherein the identifying the first set of security policies includes: comparing, by the network appliance, the second field with a second range, where the second range corresponds to a third bit location in a third bitmap, and wherein the third bit location in the third bitmap indicates a subset of the first set of security policies; upon determining that the second field is within the second range, accessing, by the network appliance, a fourth bit location in a fourth bitmap, wherein the fourth bit location in the fourth bitmap corresponds to the third bit location in the third bitmap; and based upon the value in the fourth bit location in the fourth bitmap, identifying, by the network appliance, a second set of security policies to be applied to the information packet, wherein the second set of security policies is a subset of the first set of security policies. In some such instances, identifying the set of security policies includes: determining, by the network security appliance, that the value in the fourth bit location of the fourth bitmap is different than a value in the third bit location in the third bitmap; and identifying, by the network security appliance, the set of security policies, where the set of security policies include those security policies indicated by a fifth bit position in the fourth bitmap. In other such instances, identifying the set of security policies includes: determining, by the network security appliance, that the value in the fourth bit location of the fourth bitmap is the same as a value in the third bit location in the third bitmap; and identifying, by the network security appliance, the set of security policies, where the set of security policies include those security policies indicated by the fourth bit position in the fourth bitmap.

In various instances of the aforementioned embodiments, the network security appliance includes a general purpose processor and a hardware accelerator circuit. In such instances, the receiving the information packet via the communication network is done by the general purpose processor, and wherein the method further includes: converting, by the general purpose processor, at least the first bitmap and the second bitmap into a control program, where the control program programs the hardware accelerator by implementing a search tree, and where the search tree is used by the hardware accelerator circuit to: compare the selected field with the first range; and upon determining that the selected field is within the first range, access the second bit location in the second bitmap.

In some instances of the aforementioned embodiments, the methods further include: accessing, by the network security appliance, a third bit location in the first bitmap wherein the third bit location indicates a common policy; and including, by the network security processor, the common policy in the set of security policies.

Other embodiments provide systems for correlating security policies to received information packets. Such systems include: a hardware accelerator circuit that includes s a first bitmap and a second bitmap formatted as information embedded in a node structure in a search tree. The hardware accelerator circuit is configured to execute the search tree by: comparing a first field of an information packet with a first range, where the first range corresponds to a first bit location in a first bitmap, and where the first bit location in the first bitmap indicates at least a first security policy; upon determining that the first field is within the first range, accessing a second bit location in a second bitmap, wherein the second bit location in the second bitmap corresponds to the first bit location in the first bitmap; and based at least in part upon the value in the second bit location in the second bitmap, identifying a set of security policies to be applied to the information packet. The systems further include: a processing resource and a non-transient computer readable medium coupled to the processing resource. The non-transient computer readable medium has stored therein instructions that when executed by the processing resource cause the processing resource to: receive the information packet via a communication network, where the information packet includes at least the first field and a second field; providing the first field to the hardware accelerator circuit; receiving an indication of the set of security policies from the hardware accelerator circuit; accessing at least one security policy from the set of security policies; and applying the at least one security policy to the information packet.

Yet other embodiments provide non-transient computer readable media having stored therein instructions that when executed by the processing resource cause the processing resource to: receive an information packet via a communication network, wherein the information packet includes at least a first field and a second field; provide the first field to the hardware accelerator circuit; receive an indication of a set of security policies from the hardware accelerator circuit; access at least one security policy from the set of security policies; and apply the at least one security policy to the information packet. The hardware accelerator circuit includes a first bitmap and a second bitmap formatted as a search tree, and is configured to execute the search tree by: comparing a first field of an information packet with a first range, wherein the first range corresponds to a first bit location in a first bitmap, and where the first bit location in the first bitmap indicates at least a first security policy; and upon determining that the first field is within the first range, accessing a second bit location in a second bitmap, where the second bit location in the second bitmap corresponds to the first bit location in the first bitmap.

Turning to FIG. 1A, network architecture 100 is shown in accordance with some embodiments. In the context of network architecture 100, a number of network elements (e.g., a network element 116a, a network element 116b, a network element 116c, and a network element 116d) are coupled to a local network 114. Local network 114 may be any type of communication network known in the art. Those skilled in the art will appreciate that local network 114 can be wireless network, a wired network, or a combination thereof that can be implemented as one of the various types of networks, such as an Intranet, a Local Area Network (LAN), a Wide Area Network (WAN), an Internet, and the like. Further, local network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Access to local network 114 is controlled by a network security appliance 110. In some embodiments, network security appliance 110 includes hardware acceleration circuitry that can be dynamically configured to accelerate packet classification processes and/or identifying security policies for information packets received from a communication network 102. Communication network 102 may be any type of communication network known in the art. Those skilled in the art will appreciate that, each of communication network 102 can be wireless network, a wired network, or a combination thereof that can be implemented as one of the various types of networks, such as an Intranet, a Local Area Network (LAN), a Wide Area Network (WAN), an Internet, and the like. Further, communication network 102 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Network security appliance 110 is coupled to a computer readable storage medium having stored thereon a security policy search optimization application 112. As more fully described below, security policy search optimization application 112 operates to segment and merge various security policies to optimize correlation between the various security policies and information packets received from communication network 102. In some embodiments, the optimization is formatted to program hardware acceleration circuitry included in network security appliance 110. Security policy search optimization application 112 includes instructions executable by a processor of network security appliance 110 to access a security policy database 113 that includes one or more security policies to be applied to communications passing through network security appliance 110. Based upon the disclosure provided herein, one of ordinary skill in the art will recognize a variety of security policies and sources of those security policies that may be used in relation to different embodiments.

Figure 1B:
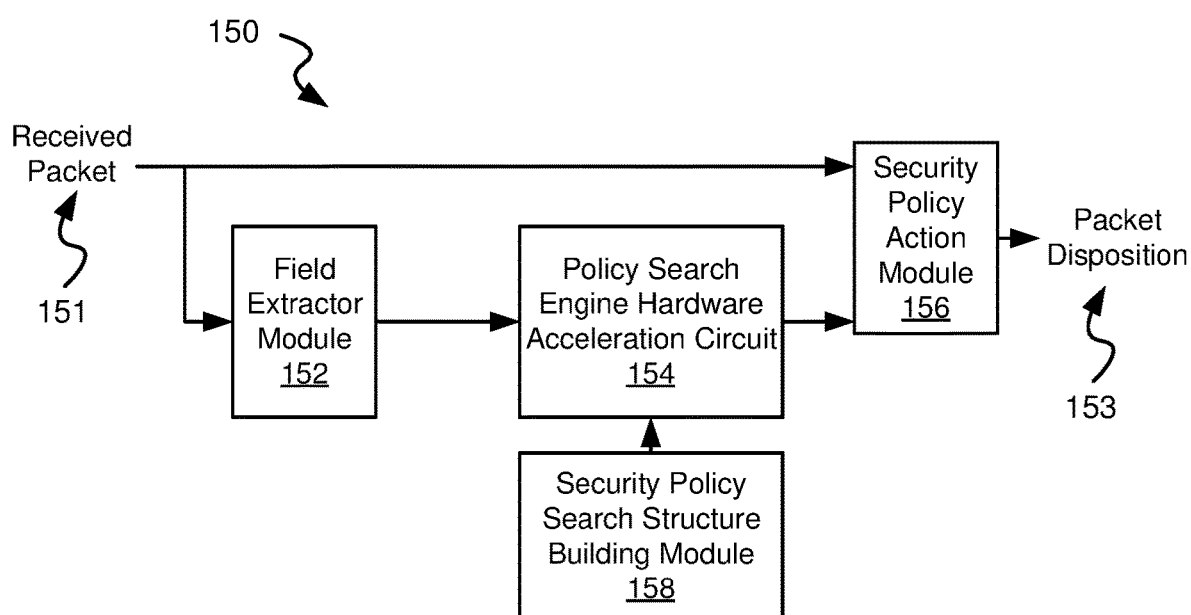

Turning to FIG. 1B, a block diagram of a security policy search and implementation engine 150 in accordance with some embodiments. Security policy search and implementation engine 150 may be implemented as part of security appliance 110. As shown, security policy search and implementation engine 150 includes a field extractor module 152 that is configured to extract multiple fields from a received packet 151. Received packet 151 may be any packet of information known in the art. In some cases, received packet 151 is received from communication network 102, and in other cases received packet 151 is received one of network elements 116 via local network 114. The fields that are extracted from received packet 151 by field extractor module 152 may include, but are not limited to, Internet Protocol (IP) addresses for source and destination, protocol number, port numbers for source and destination, and other additional public or proprietary fields defined by the network systems. In some embodiments, field extractor module 152 is implemented as instructions executing on a general purpose processor. In other embodiments, field extractor module 152 is implemented on a dynamically configurable circuit.

The fields extracted by field extractor module 152 are provided to a policy search engine hardware acceleration circuit 154. Policy search engine hardware acceleration circuit 154 compares the received fields with a search tree of security policy rules that is optimized for hardware implementation. In some embodiments, the optimization relies upon a dual bitmap based search tree created by a security policy search structure building module 158. Security policy search structure building module 158 generates a hardware image used to program the hardware of policy search engine hardware acceleration circuit 154. The hardware image is generated similar to that discussed below in relation to FIG. 2. Policy search engine hardware acceleration circuit 154 identifies one or more security policies associated with the received fields, and provides an indication of the one or more security policies to a security policy action module 156.

In turn, security policy action module 156 applies the security policies indicated by policy search engine hardware acceleration circuit 154 to received packet 151. Application of the search policies results in a packet disposition 153 that may include one of: dropping received packet 151 so it is simply ignored, reporting received packet 150 to another entity for further investigation, or forwarding received packet 150 to a defined destination IP. Such forwarding may be done with or without some level of modification to one or more of the fields in received packet 150.

Figure 1C:
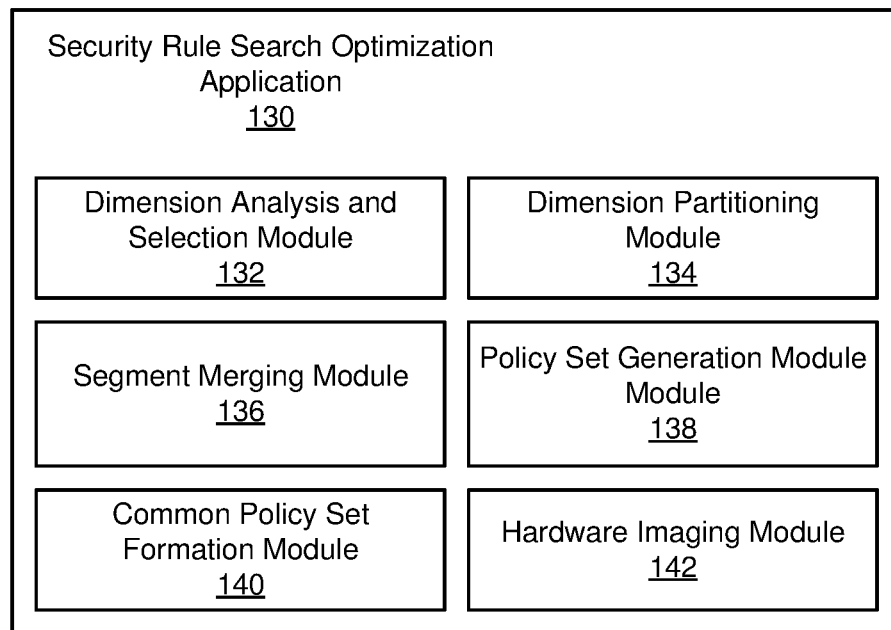

Turning to FIG. 1C, an example implementation of a security rule search optimization application 130 is shown in accordance with some embodiments. As shown in this example, security rule search optimization application 130 includes: a dimension analysis and selection module 132, a dimension partitioning module 134, a segment merging module 136, a policy set generation module 138, a common policy set formation module 140, and a hardware imaging module 142.

Dimension analysis and selection module 132 is configured to perform the processes discussed below in relation to blocks 202-204 of FIG. 2. Dimension partitioning module 134 is configured to block 206 and block 214 of FIG. 2. Common policy set formation module 140 is configured to perform the processes discussed below in relation to blocks 201-212 of FIG. 2. Segment merging module 136 is configured to perform the processes discussed below in relation to blocks 216-218 of FIG. 2. Policy set generation module 138 is configured to perform the processes of blocks 220-222 of FIG. 2. Hardware imaging module 142 is configured to perform the processes discussed below in relation to block 224 of FIG. 2.

Figure 1D:
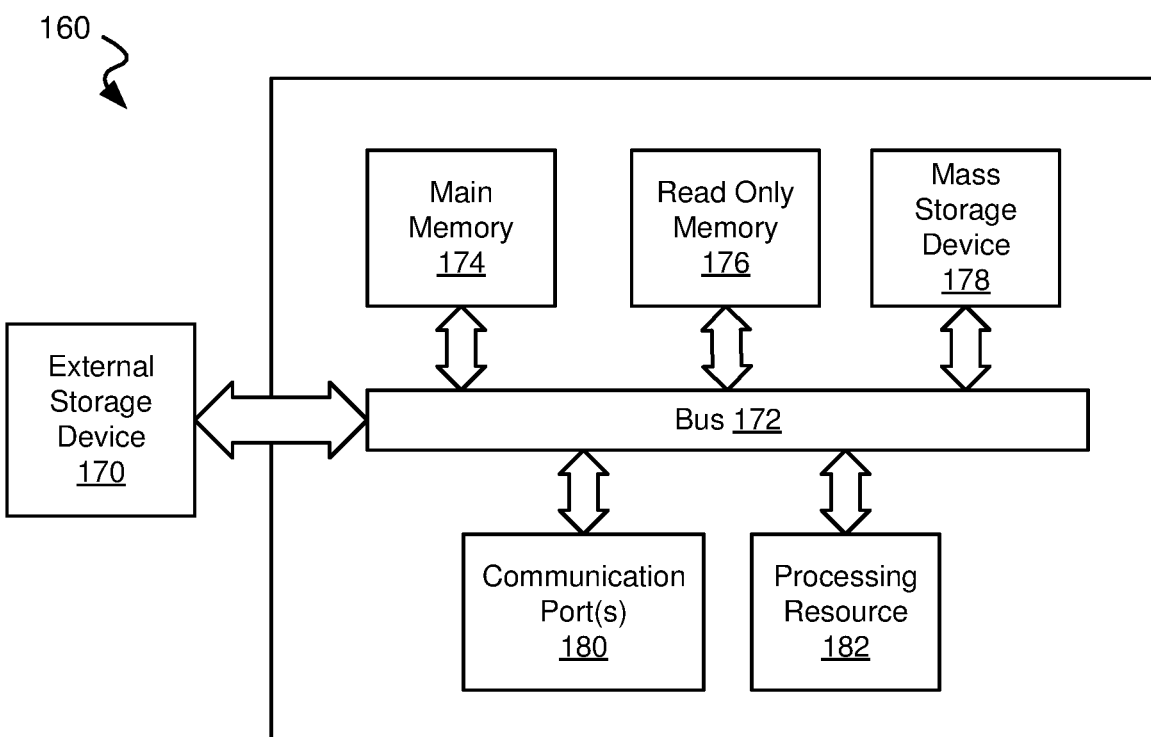

Turning to FIG. 1D, an example computer system 160 is shown in which or with which embodiments may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 116, 126, and/or network security appliances 110, 120.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
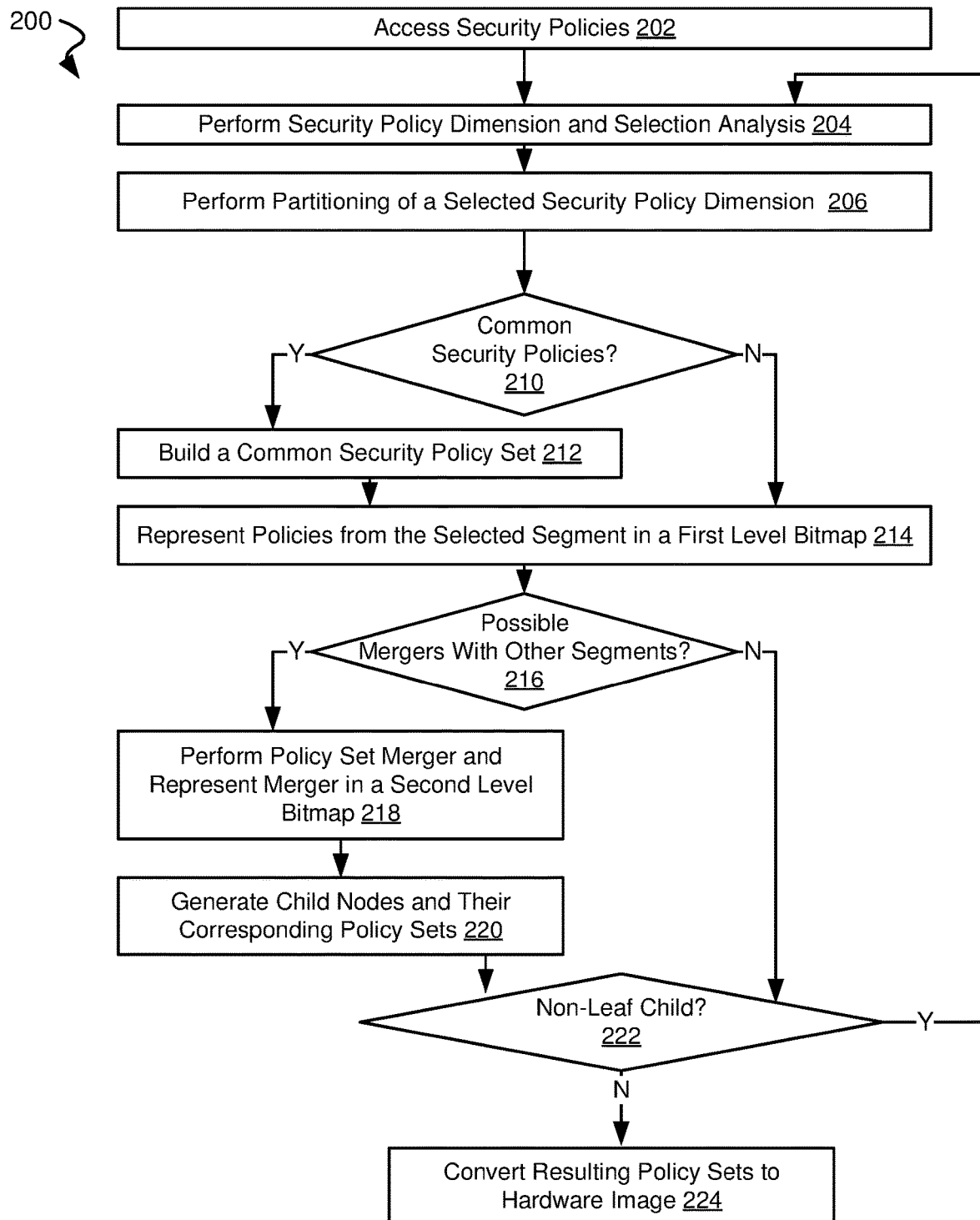
FIG. 2 is a flow diagram showing a method in accordance with some embodiments for improving security policy search in accordance with various embodiments.

Turning to FIG. 2, a flow diagram 200 shows a method in accordance with some embodiments for improving a security policy search. Following flow diagram 200, security policies to be implemented for a given network are accessed from a database of security policies (block 202). The security policies may include any security policies known in the art. Such security policies include a set of criteria indicating when the policy is to be applied, and one or more actions to be performed when a received packet triggers application of the security policy. Some of the security policies may be default security policies that are preloaded on a database, and others may be provided from one or more network administrators overseeing the network. Based upon the disclosure provided herein, one of ordinary skill in the art will recognize a variety of security policies and/or sources thereof that may be used in relation to different embodiments.

A security policy dimension and selection analysis is performed on the accessed security policies (block 204). In the set of criteria included as part of a security policy are a number of ranges for respective fields that are considered subject to the security policy. Thus, as a simple example, a security policy may apply to all source addresses between $S_0$ and $S_1$, and to all destination addresses between $D_0$ and $D_1$. Each of the criterion are dimensions. Thus, using the preceding simplified example, the range of the source addresses ($S_0$ to $S_1$) is one dimension, and the range of the destination addresses ($D_0$ and $D_1$) is another dimension. One of the dimensions for the accessed security policies is selected. In some cases, the dimension that is selected is the dimension that is used in the largest number of the accessed security policies. Based upon the disclosure provided herein, one of ordinary skill in the art will recognize other basis for selecting which dimension is selected first and which are later selected, and the order in which they are selected that may be used in relation to different inventions. The discussion of FIG. 2 is generally limited to the partitioning of a single dimension and merging applied to that dimension, however, the process may be repeated for a number of dimensions with each dimension yielding another level in a resulting search tree as discussed below in relation to FIG. 7.

Figure 3:
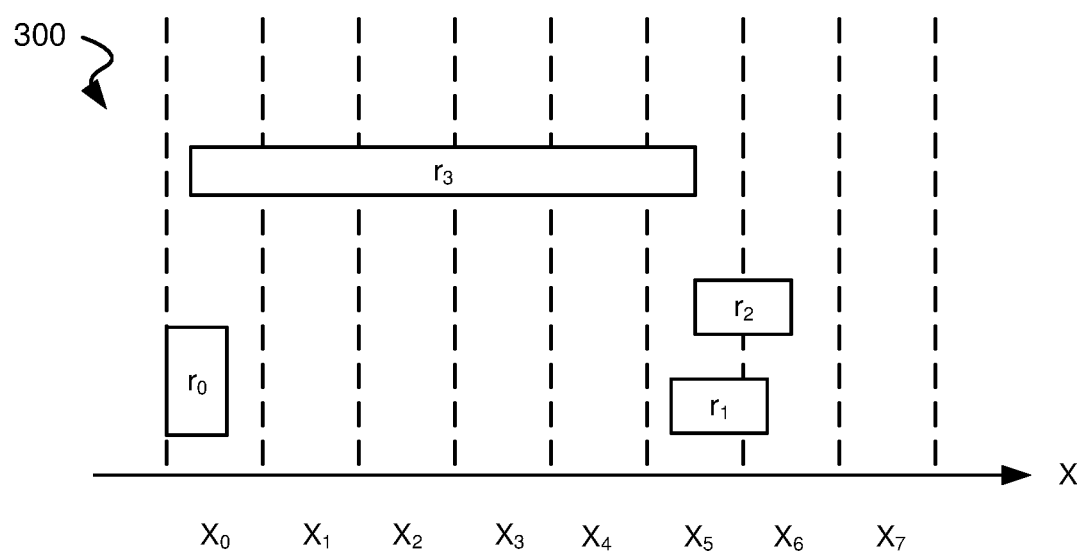
FIGS. 3-7 graphically depict examples of the respective processes of the flow diagram of FIG. 2.

Having selected a dimension for processing (block 204), partitioning of the security policy dimension into segments is performed (block 206). Turning to FIG. 3, a graphical representation 300 of a number of security policies (i.e., $r_0$, $r_1$, $r_2$, and $r_3$) is shown in relation to a number of segments (i.e., $X_0$, $X_1$, $X_2$, $X_3$, $X_4$, $X_5$, $X_6$, and $X_7$). For the purposes of the example, dimension X may be source address. As shown, security policy $r_0$ is triggered only by part of the range of dimension X within segment $X_0$; security policy $r_1$ is triggered by part of the range of dimension X within segment $X_5$ and part of the range of dimension X within segment $X_6$; security policy $r_2$ is triggered by another part of the range of dimension X within segment $X_5$ and another part of the range of dimension X within segment $X_6$; and security policy $r_3$ is triggered by part of the range of dimension X within segment $X_0$, all of the range of dimension X within segments $X_1$, $X_2$, $X_3$, and $X_4$, and part of the range of dimension X within segment $X_5$. By adjusting the size of the segments (i.e., $X_0$, $X_1$, $X_2$, $X_3$, $X_4$, $X_5$, $X_6$, and $X_7$), which security policies are triggered when a particular segment is identified changes. If the dimension size is chosen to be very large (i.e., a coarse cutting), security policies that are triggered for the dimension will generate a number of false positives as the range of the security policy for the field will be within the dimension, but will be much smaller than the dimension. For example, security policy $r_0$ will be triggered anytime segment $X_0$ is identified even though it is not necessary for the part of the dimension extending from the right of $r_0$ to the boundary of segment $X_0$. In contrast, if the dimension is chosen to be very small, the security policy will be replicated for a large number of dimensions as the security policy for the field will extend across multiple dimensions. Such replication reduces the policy set capacity of the system, and increase the design cost. For example, security policy $r_3$ is replicated across segments $X_0$, $X_1$, $X_2$, $X_3$, $X_4$, and $X_5$. The impact of adjusting the partitioning by changing the number of segments or length of segments on the merging processes is discussed more fully below in relation to FIGS. 4A-4B.

In some embodiments, a random segment size is selected for the dimension and applied. In various embodiments, power-of-two partitioning is used to define the size of the segments for the dimension. In such an approach, an algorithm measures the results between $2^{\wedge n}$ slots and $21^{\wedge(n+1)}$ slots, each time on an incremental value of n, and select a segment size based on, for example, the maximum segment count allowed by a policy search engine hardware acceleration circuit. In yet other embodiments, non-power-of-two partitioning may be used. Such a variable segment size allows for better matching between non-power-of-two segments and security policies that are triggered based upon ranges of the dimension. Such a non-power-of-two is facilitated by the dual bitmap (bm1 and bm2) approach to correlating security policies to segments that is discussed below.

Returning to FIG. 2, with the segments for the dimension defined (block 206), it is determined whether one or more security policies are common across three or more segments of the dimension (block 210). As described below, the fixed value of "three" or more segments may be replaced with an equation based approach (i.e., IF m≥CRTH*s) in some embodiments to determine whether a common policy exists. Again using FIG. 3 as an example, security policy $r_3$ extends across six segments (i.e., $X_0$, $X_1$, $X_2$, $X_3$, $X_4$, and $X_5$) of dimension X (i.e., more than two) and as such would be considered a common security policy. Returning to FIG. 2, where a common security policy is found (block 210), it is included in a common security policy set (block 212) that will be treated separate from security policies included in the dual bitmap (bm1 and bm2) approach to correlating security policies to segments that is discussed below.

Where either common security policies have been identified, included in a common security policy set, and excluded from consideration for the dual bitmap (bm1 and bm2) (block 212), or no common security policy was identified (block 210), the remaining security policies are represented in a first level bitmap (i.e., bm1) (block 214). A first level bitmap includes a '1' in each bit location corresponding to a segment of the selected dimension where at least one security policy exists, and the respective security policies are indicated for each respective '1' in the first level bitmap. Thus, again using FIG. 3 as an example, the first level bitmap would be as follows:

| | $X_7$ | $X_6$ | $X_5$ | $X_4$ | $X_3$ | $X_2$ | $X_1$ | $X_0$ |
|---|---|---|---|---|---|---|---|---|
| bm1 | 0 | 1 | 1 | 0 | 0 | 0 | 0 | 1 |

The '1' in the $X_6$ position of bm1 corresponds to security policies $r_1$ and $r_2$, the '1' in the $X_5$ position of bm1 also corresponds to security policies $r_1$ and $r_2$. The '1' in the $X_0$ position of bm1 corresponds to security policy $r_0$. Again, security policy $r_3$ was identified as a common security policy and pulled out and treated separately. In some embodiments, this separately treated security policy is included in an additional bit filed added to bm1 as follows:

| | Common | $X_7$ | $X_6$ | $X_5$ | $X_4$ | $X_3$ | $X_2$ | $X_1$ | $X_0$ |
|---|---|---|---|---|---|---|---|---|---|
| bm1 | 1 | 0 | 1 | 1 | 0 | 0 | 0 | 0 | 1 |

In this case, the '1' in the Common bit position of bm1 indicates the existence of common security policy $r_3$.

The aforementioned common policy identification process may be described generically as a merger where a security policy exists in multiple levels of a search tree, and therefore it is more efficient to treat the policy as an exception outside of the search tree. A security policy is considered a common policy where it extends across m slots under a node (along a dimension) where:

$$m \geq CRTH*s, \quad (1)$$

where s denotes the number of non-empty segments along the dimension, and CRTH (common policy ratio threshold) is a programmable float parameter between 0.0 and 1.0. When CRTH=1.0, a common policy is similar to a "conventional common policy" described in S. Singh, F. Baboescu, G. Varghese, and J. Wang, "Packet Classification using Multi-dimensional Cutting", In Proceedings of ACM SIGCOMM, 2003. The entirety of the aforementioned reference is incorporated herein by reference for all purposes. Alternatively, if a common policy is at the root dimension of a search tree, it is similar to a "big policy" described in B. Vamanan, G. Voskuilen, and T. Vijaykumar, "EffiCuts: Optimizing Packet Classification for Memory and Throughput", In Proceedings of ACM SIGCOMM, 2010. The entirety of the aforementioned reference is incorporated herein by reference for all purposes.

For a memory-efficient tree lookup, some embodiments disclosed herein use the same data structure for a given node, which can be stored in the same configuration table. More specifically, a common policy node can be kept next to the nodes representing non-empty children, and the non-empty status of the common policy node is represented by one single bit, such as the most significant bit (MSB) of bm1. Applying such an approach to the example of FIG. 3, if CRTH=0.8, for policy $r_3$, as m=6 (stretching from segments $X_0$ to $X_5$) and s=7 (only slot $X_7$ is empty), the equation m≥CRTH*s is true, and therefore security policy $r_3$ is treated as a common policy.

Returning to FIG. 2, it is determined whether security policies within the selected segment should be considered for merging with the same policies in other segments (block 216). Such merger eliminates replication of security policies across multiple segments, and thus is only applied where a security policy is associated with two or more segments of the selected dimension. A merger possibility is found where multiple segments include at least one security policy in common. Again using FIG. 3 as an example, as segments $X_6$ and $X_5$ include at least one security policy in common (in this case two security policies are found—$r_1$ and $r_2$).

Returning to FIG. 2, where possible mergers are present (block 216), a policy set merger is performed and the resulting merger is represented in a second level bitmap (bm2) (block 218). This results in a dual bitmap for the dimension including bm1 and bm2, where bm2 operates as a guide to using bm1. The merger process begins by determining the number of policies in each segment of the dimension and creating an aggregate policy set, identifying possible mergers, and performing mergers. An example merging algorithm that may be used in relation to some embodiments is shown in the following pseudocode:

```
/*Global Definitions*/
   R=TNSP /* Total Number of Security Policies (TSNP) */
   B=MM /*Upper Limit of the Number of Policies in a Single Merged Segment (1<=B<=R)
*/
   S=MS /*Maximum Number of Segments on the Dimension*/
   D=MD /*Maximum Search Distance for a Merge (1<=D<=S) */
   F=SF /* Scaling Factor (0.0<=F<=1) */
/*Determine the Number of Policies and Create Aggregate Policy Set*/
For a Given Dimension:
   pol_count(a, b) /* count each policy that is found from segment a to segment b of the */
        /* dimension, while allowing a respective policy to only be counted once */
   pol_set(a, b) /* identify each unique policy found from segment a to segment b of the
   dimension */
/* Identify Potential Merge Possibilities */
 merge( ) {
    i=0;
    while (i<S) { /*continue until all segments of the dimension considered*/
       for (j=1; j<D; ++j) { /* do for a segment within a distance D of another segment*/
          if (pol_count(i, i+j)) <= B &&
          pol_count(i, i+j)) <= F*(pol_count(i, i+j-1)+(pol_count(i+j, i+j))) {
             merge(i, i+j) /* merge segments i to i+j of the dimension */
             i=i+j
             break /* start next iteration of the while loop*/
          } /* If condition*/
       } /*for loop*/
    } /*while loop*/
 }
/* Generate the Second Level Bitmap (bm2) Representing Merge segments s1 to s2 */
 Merge_segments(s1, s2) {
    For (i=s1; i<=s2; ++i){
       bm2[i] = 0 /*set bitmap value for the position i to '0' indicating a merge */
       merge security policies corresponding to segment i to segment s2
    }
    bm2[s2] = 1 /*set bitmap value for position s2 to '1' indicating location of policies*/
 }
```

As shown in the pseudocode above that represents an example algorithm that may be used in relation to some embodiments to perform the merge process of flow diagram 200, the merge( ) algorithm uses a scaling factor (F) which is a programmable float value between 0.0 and 1.0. In the example algorithm shown above, a merge is indicated (block 216) when the number of security policies (i.e., pol_count(a, b)) is less than F times the number of security policies in existence before application of the merging process. The propensity for triggering a merger (block 216) is less the closer the value of F is to 0.0, and is greater the closer the value of F is to 1.0. In the above described algorithm B represents an upper limit for the number of security policies that may be included in a leaf node.

Again using FIG. 3 as an example, the resulting bm1 and bm2 are as follow:

| Common | $X_7$ | $X_6$ | $X_5$ | $X_4$ | $X_3$ | $X_2$ | $X_1$ | $X_0$ |
|---|---|---|---|---|---|---|---|---|
| bm1 | 1 | 0 | 1 | 1 | 0 | 0 | 0 | 0 | 1 |

| | $X_7$ | $X_6$ | $X_5$ | $X_4$ | $X_3$ | $X_2$ | $X_1$ | $X_0$ |
|---|---|---|---|---|---|---|---|---|
| bm2 | 0 | 1 | 0 | 0 | 0 | 0 | 0 | 1 |

As can be appreciated, the merging of segments $X_6$ and $X_5$ results in elimination of the '1' from the $X_5$. When the combination of bm1 and bm2 are implemented in a policy search engine hardware acceleration circuit, the common bit is checked. Where common bit is a '1', the policy or policies associated with that bit are identified for application. A bit of bm1 is checked prior to a corresponding bit of bm2. Where it is found that the bit in bm1 is a '1', the corresponding bit position in bm2 is queried to identify the nearest bit that is a '1' with a bit location greater than or equal to the current bit location. Thus, using bm1 and bm2 above where the bit $X_3$ is the current bit, that bit is found in bm1 to be a '0' and as such no security policies are included in the represented segment of the dimension and bm2 is not queried. In this case, no security policy is identified for implementation. In contrast where the bit $X_5$ is the current bit, that bit is found in bm1 to be a '1'. As such, bm2 is queried to find the closest bit of $X_6$ or $X_7$ that is a '1'. In this case it is $X_6$ in bm2 that is a '1', and it is the security policy or policies associated with $X_6$ (i.e., security policies $r_1$ and $r_2$) that are selected for implementation. As another example where the bit $X_0$ is the current bit, that bit is found in bm1 to be a '1'. As such, bm2 is queried to find the closest bit of $X_0$, $X_1$, $X_2$, $X_3$, $X_4$, $X_5$, $X_6$, or $X_7$ that is a '1'. In this case it is $X_0$ in bm2 that is a '1' and it is the security policy or policies associated with $X_0$ (i.e., security policy $r_0$) that are selected for implementation. From a hardware point of view, the extra processing cost introduced by bm2 is minimal. Therefore, there is no need to keep an extra bit to turn on bm2 or turn off bm2. Rather, bm2 is always on.

Figure 6:
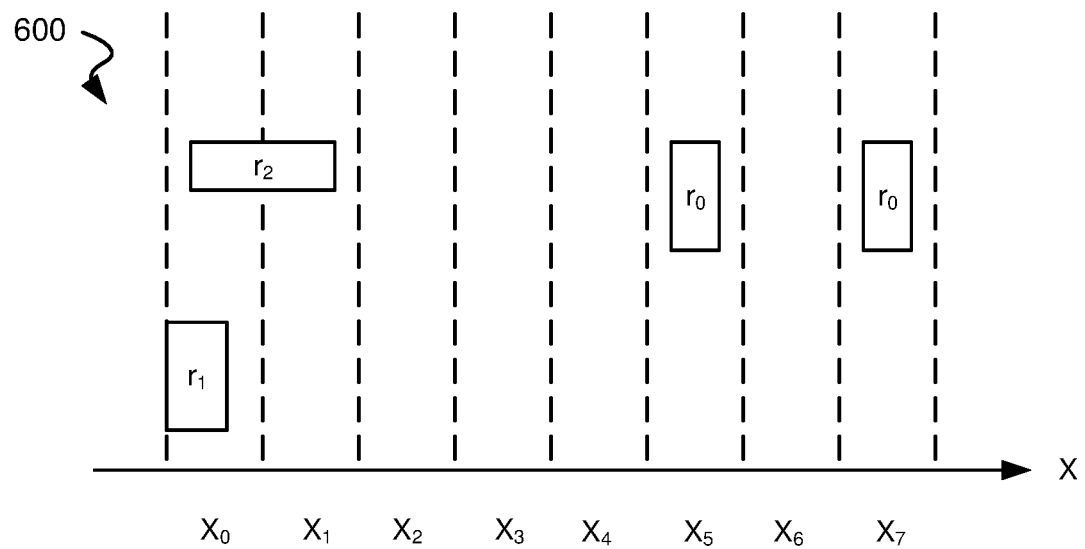

The above described algorithm is applied to leaf nodes (to neighboring segments along the dimension (e.g., s1 to s2)) whether they are at consecutive locations or not. For example, referring to FIG. 6, a graphical representation 600 of a number of security policies (i.e., $r_0$, $r_1$, and $r_2$) are shown in relation to a number of segments (i.e., $X_0$, $X_1$, $X_2$, $X_3$, $X_4$, $X_5$, $X_6$, and $X_7$). For the purposes of the example, dimension X may be source address. As shown, security policy $r_0$ is triggered by part of the range of dimension X within segment $X_5$, and by part of the range of dimension X within segment $X_7$; security policy $r_1$ is triggered by part of the range of dimension X within segment $X_0$; and security policy $r_2$ is triggered by another part of the range of dimension X within segment $X_0$ and part of the range of dimension X within segment $X_1$. Using FIG. 6 as an example, the resulting bm1 and bm2 are as follow:

| | Common | $X_7$ | $X_6$ | $X_5$ | $X_4$ | $X_3$ | $X_2$ | $X_1$ | $X_0$ |
|---|---|---|---|---|---|---|---|---|---|
| bm1 | 0 | 1 | 0 | 1 | 0 | 0 | 0 | 1 | 1 |

| | $X_7$ | $X_6$ | $X_5$ | $X_4$ | $X_3$ | $X_2$ | $X_1$ | $X_0$ |
|---|---|---|---|---|---|---|---|---|
| bm2 | 1 | 0 | 0 | 0 | 0 | 0 | 1 | 0 |

As can be appreciated, the merging of segments $X_1$ and $X_0$ results in elimination of the '1' from the $X_0$ position in bm2. Segment $X_1$ in bm2 is associated with both security policy $r_1$ and security policy $r_2$. The merging of segments $X_7$ and $X_5$ results in elimination of the '1' from the $X_5$ position in bm2. Segment $X_7$ is associated with the security policy $r_0$. Similar to that described above in relation to FIG. 3, where the common bit is '0' no common security policies exist. A bit of bm1 is checked prior to a corresponding bit of bm2. Where it is found that the bit in bm1 is a '1', the corresponding bit position in bm2 is queried to identify the nearest bit that is a '1' with a bit location greater than or equal to the current bit location. Thus, using bm1 and bm2 above where the bit $X_0$ is the current bit, that bit is found in bm1 to be a '1' and as such the next higher bit position in bm2 that is a '1' is identified. In this case it is bit $X_1$ which is associated with security policy $r_1$ and security policy $r_2$ which would be applied to an information packet received that matches either $X_1$ or $X_0$ along the dimension. As another example using bm1 and bm2 above where the bit $X_5$ is the current bit, that bit is found in bm1 to be a '1' and as such the next higher bit position in bm2 that is a '1' is identified. In this case it is bit $X_7$ which is associated with security policy $r_0$ which would be applied to an information packet received that matches either $X_7$ or $X_5$ along the dimension.

Returning to FIG. 2, the security policies associated with the respective bits in bm2 are assembled into policy sets (block 220). The security policies in the assembled policy sets will be applied to received information packets including a field that intersects the dimension to which corresponding to the child node (i.e., segment in the dimension) to which the policy set is associated. It is then determined where there are any non-leaf children that remain in the currently processing dimension that can be further divided by using a second dimension (block 222). Where no non-leaf children exist for the previously processed dimension (block 222), the resulting dual bitmaps are converted to a hardware image (block 224) that can be used to efficiently search received information packets and access policy sets to be applied.

In contrast, where one or more non-leaf children exist for the previously processed dimension (block 222), additional processing on another dimension may be warranted to reduce oversubscription of security policies to received information packets. In such a case, the processes of flow diagram 200 are repeated for the next dimension for any remaining non-leaf child nodes. An example of this next dimension processing is discussed below in relation to FIG. 7.

It is noted that a security policy search using the dual bitmaps resulting from the method of FIG. 2 can be very effectively done using a general process executing software instructions. In such cases, the processes of block 224 are not used. Where the dual bitmaps are used in a hardware accelerator system handling all or part of correlating security policies to received information packets the following hardware accelerator instructions may be used as part of implementing the processes of block 224.

| Instruction | Description |
|---|---|
| Even range comparison | A given element in the n-tuple is compared against a set of evenly cut ranges. The matched range ID is written into the destination register D. |
| Bitmap count | A source register A's value (bitmap location) is used to count the number of ones among another source register B (the bitmap)'s bits [A-1:0]. The counting is qualified by bit B[A]. the result is written into the destination register D. The value in register D is further used to calculate the pointer to the child node. |
| Merged_bitmap_count | A source register A's value (bitmap location) is used to select bit B[A] from source register B. if it is 0, a false flag is set. Otherwise, source register C's bits (merged bitmap) are searched from bit location A up to the most significant bit. The result is written into the destination register D. The value in register D is further used to calculate the pointer to the merged child node. |

The "even range comparison" instruction is used to find the matched range for the current packet's one particular tuple (source IP address for example) in a set of evenly cut ranges. The "bitmap count" instruction is used to find child node when no merge is needed. The "merged bitmap count" instruction is used to find child node when merge is needed. Based upon the disclosure provided herein, one of ordinary skill in the art will recognize a variety other instructions that may be used in relation to different embodiments.

Further, implementation of the process of block 224 involves use of a compiler to convert the dual bitmap(s) to hardware. Based upon the disclosure provided herein, one of ordinary skill in the art will recognize a variety of processes that may be used to convert the dual bitmap(s) to hardware in accordance with different embodiments.

Figure 4A:
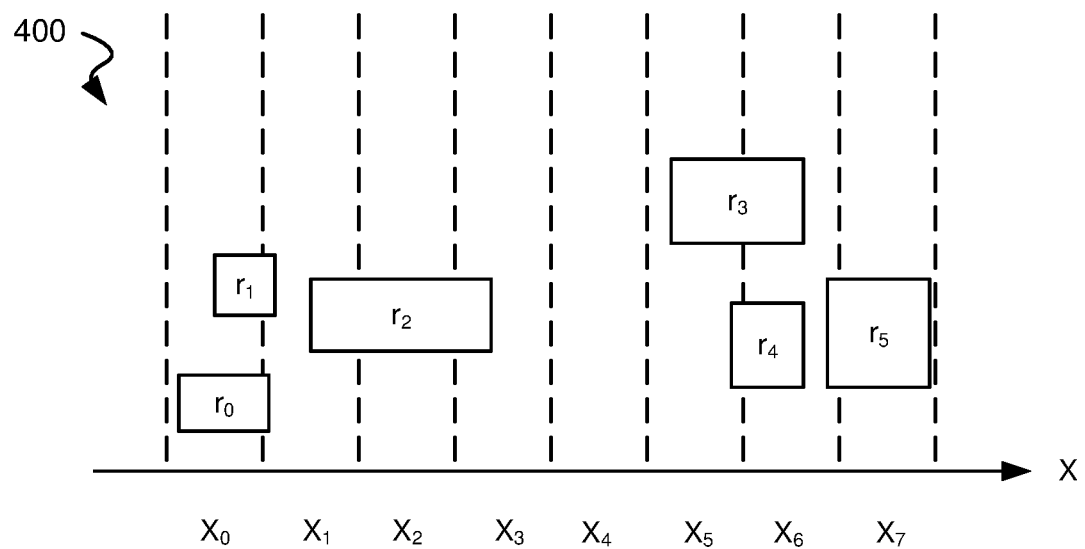
Figure 4B:
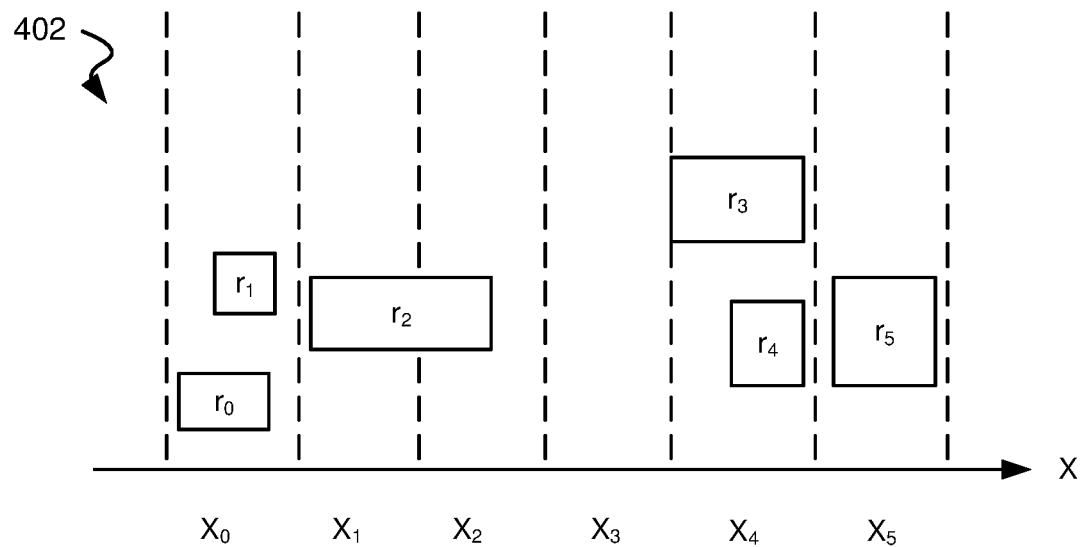

Turning to FIGS. 4A-4B, two graphical representations 400, 402 of a number of security policies (i.e., $r_0$, $r_1$, $r_2$, $r_3$, $r_4$, and $r_5$) are shown in relation to a number of segments (i.e., $X_0$, $X_1$, $X_2$, $X_3$, $X_4$, $X_5$, $X_6$, and $X_7$ for FIG. 4A; and $X_0$, $X_1$, $X_2$, $X_3$, $X_4$, and $X_5$ for FIG. 4B). Referring specifically to FIG. 4A, security policy $r_0$ is triggered by part of the range of dimension X within segment $X_0$ and part of the range of dimension X within segment $X_1$; security policy $r_1$ is triggered by part of the range of dimension X within segment $X_0$ and part of the range of dimension X within segment $X_1$; security policy $r_2$ is triggered by part of the range of dimension X within segment $X_1$, the entirety of the range of dimension X within segment $X_2$, and part of the range of dimension X within segment $X_3$; security policy $r_3$ is triggered by part of the range of dimension X within segment $X_5$, and part of the range of dimension X within segment $X_6$; security policy $r_4$ is triggered by part of the range of dimension X within segment $X_5$, and part of the range of dimension X within segment $X_6$; and security policy $r_5$ is triggered by part of the range of dimension X within segment $X_6$, and part of the range of dimension X within segment $X_7$. It is noted that there is an oversubscription of security policies that are applied to some of the segments. This either results in a waste of resources, or the addition of another layer to a search tree to differentiate which policies are to be applied in an oversubscribed segment which increases search induced latency.

Using the example merging algorithm described above where B=2, segment $X_1$ cannot point to a final leaf node as pol_set(x1, x1)={r0, r1, r2} and pol_cnt(x1, x1)=3>B. Similarly, segment $X_6$ cannot point to a final leaf. The resulting bm1 and bm2 are as follow:

| Common | $X_7$ | $X_6$ | $X_5$ | $X_4$ | $X_3$ | $X_2$ | $X_1$ | $X_0$ |
|---|---|---|---|---|---|---|---|---|
| bm1 | 0 | 1 | 1 | 1 | 0 | 1 | 1 | 1 |

| | $X_7$ | $X_6$ | $X_5$ | $X_4$ | $X_3$ | $X_2$ | $X_1$ | $X_0$ |
|---|---|---|---|---|---|---|---|---|
| bm2 | 1 | 1 | 1 | 0 | 1 | 0 | 1 | 1 |

Based upon the combination of bm1 and bm2, any received information packet found within segment $X_0$ of the X dimension will have both security policy $r_1$ and security policy $r_0$ applied thereto; any received information packet found within segment $X_1$ of the X dimension will have all of security policy $r_2$, security policy $r_1$, and security policy $r_0$ applied thereto; any received information packet found within segment $X_2$ or segment $X_3$ of the X dimension will have security policy $r_2$ applied thereto; any received information packet found within segment $X_5$ of the X dimension will have both security policy $r_3$ and security policy $r_4$ applied thereto; any received information packet found within segment $X_6$ of the X dimension will have all of security policy $r_3$, security policy $r_4$, and security policy $r_5$ applied thereto; and any received information packet found within segment $X_7$ of the X dimension will have security policy $r_5$ applied thereto.

In this case, both segment $X_1$ and segment $X_6$ would be benefitted by a coarser but non-power-of-two cut as shown below in relation to FIG. 4B. While it may be possible to add another level to the search tree to further divide individual segments, such would require a search tree to go to a deeper level to make a decision which adds latency. Using such a deeper level can be avoided where the cuts result in coarser but non-power-of-two segments as shown in FIG. 4B.

Turning to FIG. 4B, security policy $r_0$ is triggered only by part of the range of dimension X within segment $X_0$; security policy $r_1$ is triggered only by part of the range of dimension X within segment $X_0$; security policy $r_2$ is triggered by part of the range of dimension X within segment $X_1$, and part of the range of dimension X within segment $X_2$; security policy $r_3$ is triggered by only part of the range of dimension X within segment $X_4$; security policy $r_4$ is triggered by only part of the range of dimension X within segment $X_5$; and security policy $r_5$ is triggered by only part of the range of dimension X within segment $X_5$. As mentioned above, by using a coarser but non-power-of-two cut, the need to add another level to a search tree to resolve the oversubscription of security policies applicable to individual segments is eliminated.

The resulting bm1 and bm2 are as follow:

| Common | $X_7$ | $X_6$ | $X_5$ | $X_4$ | $X_3$ | $X_2$ | $X_1$ | $X_0$ |
|---|---|---|---|---|---|---|---|---|
| bm1 | 0 | 0 | 0 | 1 | 1 | 0 | 1 | 1 |

| | $X_7$ | $X_6$ | $X_5$ | $X_4$ | $X_3$ | $X_2$ | $X_1$ | $X_0$ |
|---|---|---|---|---|---|---|---|---|
| bm2 | 0 | 0 | 1 | 1 | 0 | 1 | 0 | 1 |

Based upon the combination of bm1 and bm2, any received information packet found within segment $X_0$ of the X dimension will have both security policy $r_1$ and security policy $r_0$ applied thereto which is the same as occurred in example graphical representation 400 of FIG. 4A; any received information packet found within segment $X_1$ or $X_2$ of the X dimension will have only security policy $r_2$ applied thereto which is substantially less than what occurred in example graphical representation 400 of FIG. 4A; any received information packet found within segment $X_4$ dimension will have both security policy $r_3$ and security policy $r_4$ applied thereto which is more than what occurred in example graphical representation 400 of FIG. 4A; and any received information packet found within segment $X_5$ of the X dimension will have only security policy $r_5$ applied thereto which is less than what occurred in example graphical representation 400 of FIG. 4A. As segment $X_6$ and $X_7$ no longer exist, they do not represent any security policies which is a substantial change to that of example graphical representation 400 of FIG. 4A.

Figure 5:
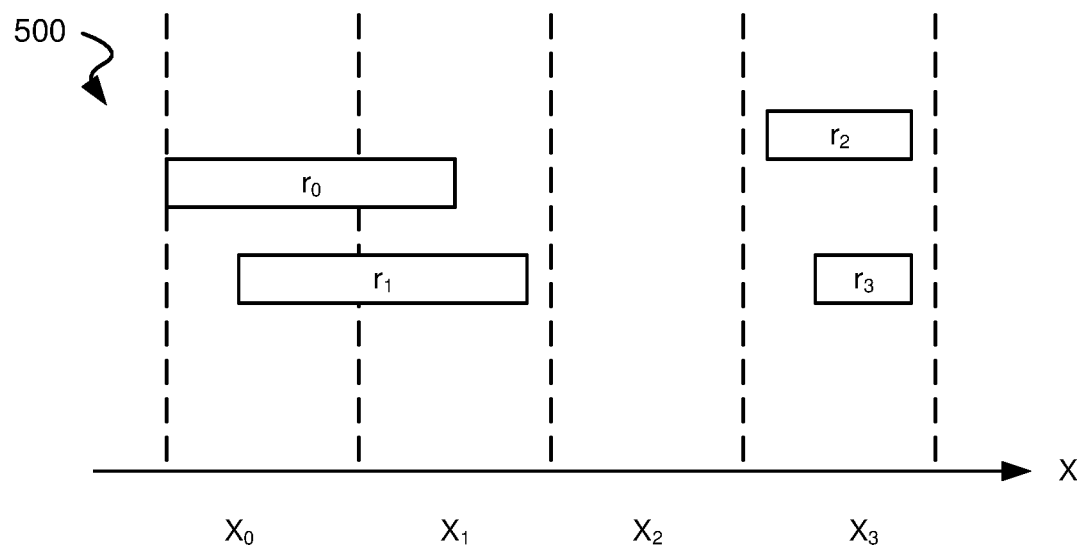

Turning to FIG. 5, a graphical representation 500 of a number of security policies (i.e., $r_0$, $r_1$, $r_2$, and $r_3$) is shown in relation to a number of segments (i.e., $X_0$, $X_1$, $X_2$, and $X_3$). As shown, security policy $r_0$ is triggered by part of the range of dimension X within segment $X_0$, and part of the range of dimension X within segment $X_1$; security policy $r_1$ is triggered by part of the range of dimension X within segment $X_0$, and part of the range of dimension X within segment $X_1$; security policy $r_2$ is triggered by part of the range of dimension X within segment $X_3$; and security policy $r_3$ is triggered by part of the range of dimension X within segment $X_3$.

The resulting bm1 and bm2 are as follow:

| Common | $X_3$ | $X_2$ | $X_1$ | $X_0$ |
|---|---|---|---|---|
| bm1 | 0 | 1 | 0 | 1 | 1 |

| | $X_3$ | $X_2$ | $X_1$ | $X_0$ |
|---|---|---|---|---|
| bm2 | 1 | 0 | 1 | 0 |

Based upon the combination of bm1 and bm2, any received information packet found within segment $X_0$ or segment $X_1$ of the X dimension will have both security policy $r_1$ and security policy $r_0$ applied thereto; and any received information packet found within segment $X_3$ of the X dimension will have security policy $r_2$ and security policy $r_3$ applied thereto.

Figure 7:
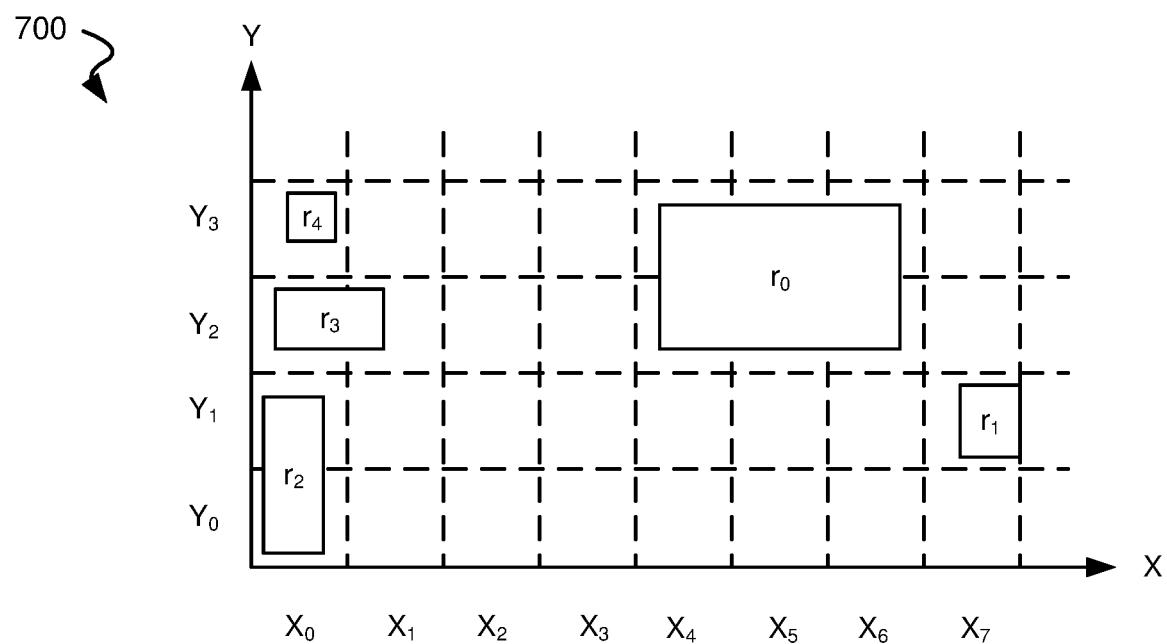

Turning to FIG. 7, a graphical representation 700 shows a two iteration process through the process of FIG. 2 each for a respective dimension, with the first iteration on the first dimension yielding a first level search in a resulting search tree, and second iteration on the second dimension yielding a second level search in the resulting search tree. Graphical representations 700 shows a number of security policies (i.e., $r_0$, $r_1$, $r_2$, $r_3$, and $r_4$) are shown in relation to a number of segments (i.e., $X_0$, $X_1$, $X_2$, $X_3$, $X_4$, $X_5$, $X_6$, and $X_7$) in a first dimension X, and in relation to a number of segments (i.e., $Y_0$, $Y_1$, $Y_2$, and $Y_3$) in a second dimension Y. In particular, considering on the first dimension X, security policy $r_1$ is triggered only by part of the range of dimension X within segment $X_7$; security policy $r_0$ is triggered by part of the range of dimension X within segment $X_4$, by the entirety of the range of dimension X within segment $X_5$, and by part of the range of dimension X within segment $X_6$; security policy $r_2$ is triggered by part of the range of dimension X within segment $X_0$; security policy $r_3$ is triggered by part of the range of dimension X within segment $X_0$, and part of the range of dimension X within segment $X_1$; and security policy $r_4$ is triggered by only part of the range of dimension X within segment $X_0$.

The resulting $bm1_x$ and $bm2_x$ for the first dimension X are as follow:

| | Common | $X_7$ | $X_6$ | $X_5$ | $X_4$ | $X_3$ | $X_2$ | $X_1$ | $X_0$ |
|---|---|---|---|---|---|---|---|---|---|
| $bm1_x$ | 0 | 1 | 1 | 1 | 1 | 0 | 0 | 1 | 1 |

| | $X_7$ | $X_6$ | $X_5$ | $X_4$ | $X_3$ | $X_2$ | $X_1$ | $X_0$ |
|---|---|---|---|---|---|---|---|---|
| $bm2_x$ | 1 | 1 | 0 | 0 | 0 | 0 | 1 | 0 |

This represents the first level search using dimension X in the search tree. Based upon the combination of $bm1_x$ and $bm2_x$, any received information packet found within segment $X_0$ or segment $X_1$ of the X dimension will have all of security policy $r_2$, security policy $r_3$, and security policy $r_4$ applied thereto which is inefficient; any received information packet found within segment $X_4$, segment $X_5$, or segment $X_6$ of the X dimension will have security policy $r_0$ applied thereto; and any received information packet found within segment $X_7$ of the X dimension will have security policy $r_1$ applied thereto.

In this case, the process of FIG. 2 is applied to the second dimension Y, but only for the inefficient segments where an oversubscription of security policies is applied based upon a search in the X dimension only. In this case where any received information packet found within segment $X_0$ or segment $X_1$ of the X dimension will have all of security policy $r_2$, security policy $r_3$, and security policy $r_4$ applied, $X_0$ and segment $X_1$ of the X dimension are processed using the second dimension (i.e., the Y dimension) to further segregate which security policy applied. In this case, security policy $r_2$ is triggered by part of the range of dimension Y within segment $Y_0$, and part of the range of dimension Y within segment $Y_1$; security policy $r_3$ is triggered by part of the range of dimension Y within segment $Y_2$; security policy $r_4$ is triggered by part of the range of dimension Y within segment $Y_3$.

The resulting $bm1_y$ and $bm2_y$ for the first dimension Y as it is applied in relation to segment $X_0$ and segment $X_1$ are as follow:

| | $Y_3$ | $Y_2$ | $Y_1$ | $Y_0$ |
|---|---|---|---|---|
| $bm1_y$ | 1 | 1 | 1 | 1 |

| | $Y_3$ | $Y_2$ | $Y_1$ | $Y_0$ |
|---|---|---|---|---|
| $bm2_y$ | 1 | 1 | 1 | 0 |

This represents the second level search using dimension Y in the search tree where either the X dimension was within either segment $X_0$ or segment $X_1$. Based upon the combination of $bm1_y$ and $bm2_y$, any received information packet found within segment $X_0$ or segment $X_1$ of the X dimension (used in a first level search) and within either segment $Y_0$ or segment $Y_1$ in the Y dimension (used in a second level search) will have only security policy $r_2$ applied thereto which is more efficient than would be if only the X dimension was used; any received information packet found within segment $X_0$ or segment $X_1$ of the X dimension (used in a first level search) and within segment $Y_2$ in the Y dimension (used in a second level search) will have only security policy $r_3$ applied thereto which is more efficient than would be if only the X dimension was used; and; any received information packet found within segment $X_0$ or segment $X_1$ of the X dimension (used in a first level search) and within segment $Y_3$ in the Y dimension (used in a second level search) will have only security policy $r_4$ applied thereto which is more efficient than would be if only the X dimension was used.

In addition to reducing replication of security policies in segments across a single dimension, the dual-bitmap scheme (bm1, bm2) can be applied to save the effort of using another layer of search to reduce the number of security policies implicated by a segment at a higher level. It is noted that three or more dimensions may be applied where necessary to further refine the number of security policies applied to any received information packet to close to the number of security policies actually demanded by the rule sets. In this way, the oversubscription of security policies can be reduced.

Figure 8:
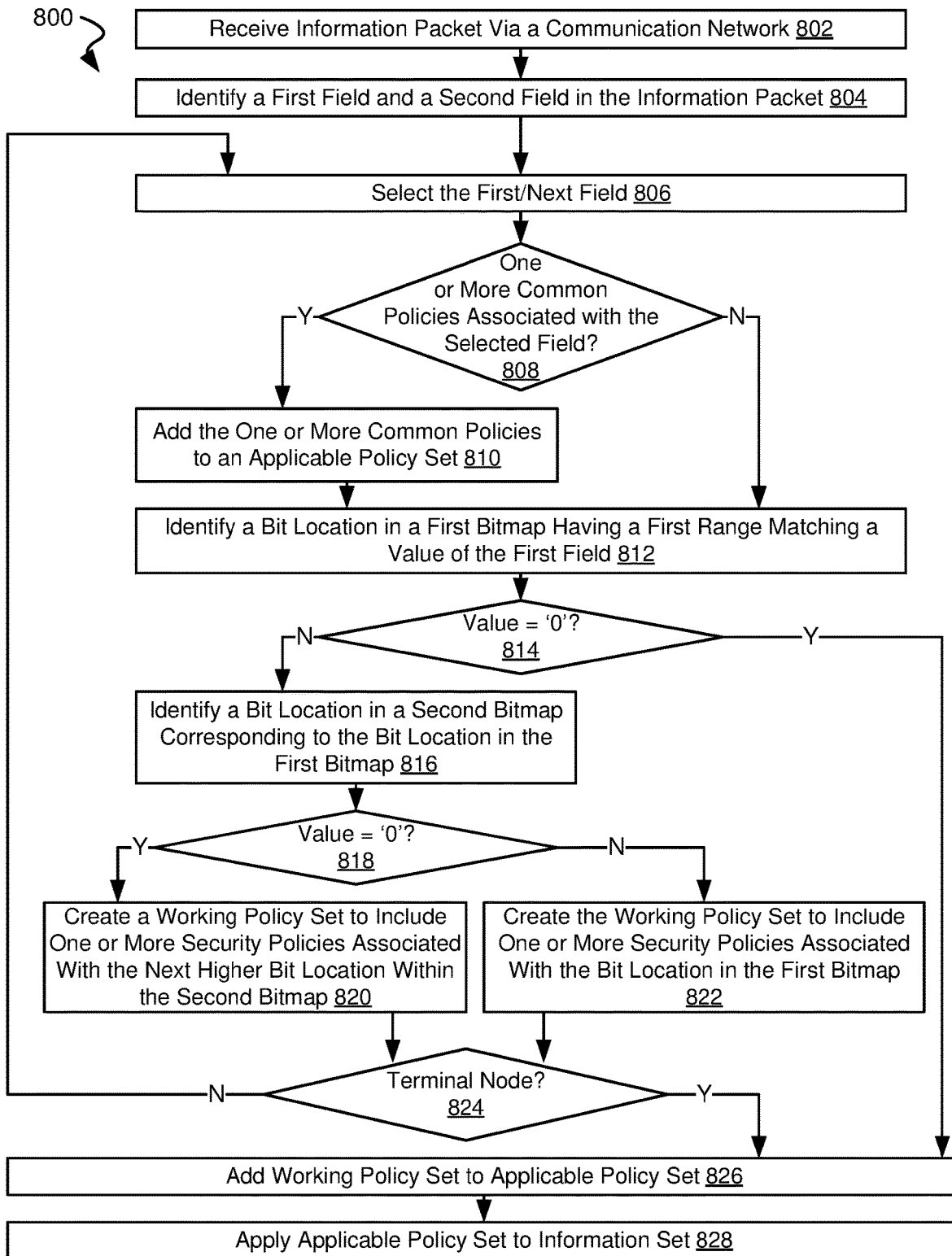
FIG. 8 is a flow diagram showing a method in accordance with some embodiments for applying a search tree based upon a dual bitmap to correlate security policies to a received information packet.

Turning to FIG. 8, a flow diagram 800 shows a method in accordance with some embodiments for applying a search tree based upon a dual bitmap to correlate security policies to a received information packet. Following flow diagram 800, an information packet is received that includes a set of fields (block 802). In one embodiment, one of the set of fields may be a source address, and another one of the set of fields may be a destination address. Based upon the disclosure provided herein, one of ordinary skill in the art will recognize a variety of information that may be included in the selected field, and/or a variety of additional fields that may be included in the information packet.

The fields in the information packets are identified (block 804), and a first of the fields is selected for processing (block 806). The field that is selected corresponds to a root node of a search tree based upon dual bitmaps. The dual bitmaps may be similar to those discussed above in relation to FIGS. 2-7. It is determined whether one or more common policies are associated with the selected field (block 808). This may be done, for example, by checking to see if a common bit of a first bitmap of the dual bitmaps is set to '1'. Where one or more common policies are associated with the selected field (block 808), the one or more common policies are included in an applicable policy set (block 810).

A bit location of the first bitmap corresponding to the value of the selected field is identified (block 812), and it is determined whether the identified bit location has a value of '0' indicating no policies associated with the segment or a '1' indicating that one or more policies are associated with the segment (block 814). Where the value is '0' (block 814), no policies are associated with the segment and processing ends by incorporating whatever policies have been included in a working policy set (if any) to the applicable policy set (block 826), and each of the policies (if any) included in the applicable policy set are applied to the information packet (block 828).

Alternatively, where the value is '1' (block 814), a bit location in a second bitmap that corresponds to the bit location in the first bitmap is identified (block 816). It is determined whether the identified bit location in the second bitmap has a value of '0' indicating merger of segments or a '1' indicating no merger of segments (block 818). Where the value is '1' (block 818), the working policy set is created to include the one or more policies associated with the bit location in the first bitmap (block 822). Alternatively, where the value is '0' (block 818), the working policy set is created to include the one or more policies associated a next more significant bit of the second bitmap from the bit location in the second bitmap (block 820).

It is then determined whether the selected field corresponds to a terminal node (block 824). A terminal node occurs when no additional fields in the information packet remain to be processed. Where an additional field remains to be processed (block 824), the next field is selected (block 806) and the processes of blocks 808-824 are repeated for the next field. Alternatively, where no additional field remains to be processed (block 824), whatever policies included in a working policy set are added the applicable policy set (block 826), and the policies included in the applicable policy set are applied to the information packet (block 828).

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for associating a set of security policies to dual bitmaps for policy correlation, the method comprising:
    accessing, by a processing resource, at least a first security policy and a second security policy, wherein the first security policy includes at least a first application criteria and the second security policy includes at least a second application criteria;
    correlating, by the processing resource, the first application criteria to a first subset of segments represented by a first bitmap, and the second application criteria to a second subset of segments represented by the first bitmap;
    determining, by the processing resource, that at least two segments represented by the first bitmap are correlated to the first security policy;
    forming, by the processing resource, a second bitmap including bit locations that correspond to each of the at least two segments represented by the first bitmap; and
    associating, by the processing resource, only one of the bit locations in the second bitmap with a set of security policies for all of the at least two segments represented by the first bitmap that are correlated to the first security policy, wherein the set of security policies includes at least the first security policy.

2. The method of claim 1, the method further comprising:
    identifying, by the processing resource, the second security policy as a common security policy based at least in part on the second application criteria; and
    associating, by the processing resource, a common bit location in the first bitmap with the second security policy.

3. The method of claim 2, wherein the second application criteria extends into at least three segments represented by the first bitmap.

4. The method of claim 1, wherein the first application criteria is selected from a group consisting of: a single value, a continuous range of values, and a non-continuous range of values.

5. The method of claim 4, wherein the single value, the continuous range of values, or the non-continuous range of values may correspond to a field selected from a group consisting of: a source address, and a destination address.

6. The method of claim 1, wherein the first application criteria is selected from a group consisting of: a source address range, a destination address range, a protocol range, a source port range, and a destination port range.

7. The method of claim 1, wherein the at least two segments represented by the first bitmap determined to be correlated to the first security policy are continuous segments.

8. The method of claim 1, wherein the first subset of segments represented by the first bitmap and the second subset of segments represented by the first bitmap are along a dimension represented by the first bitmap, the method further comprising:
    partitioning the first bitmap along the dimension to yield the segments represented by the first bitmap.

9. The method of claim 8, wherein a number of segments is selected to reduce a number of security policies extending beyond one segment.

10. The method of claim 1, wherein the set of security policies is a first set of security policies, wherein the first security policy includes a third application criteria and the second security policy includes a fourth application criteria, the method further comprising:
    correlating, by the processing resource, the third application criteria to a third subset of segments represented by a third bitmap, and the fourth application criteria to a fourth subset of segments represented by the third bitmap;
    determining, by the processing resource, that at least two segments represented by the third bitmap are correlated to the first security policy;
    forming, by the processing resource, a fourth bitmap including bit locations that correspond to each of the at least two segments represented by the third bitmap; and
    associating, by the processing resource, only one of the bit locations in the fourth bitmap with a second set of security policies for all of the at least two segments represented by the third bitmap that are correlated to the first security policy, wherein the second set of security policies includes at least the first security policy.

11. A system for correlating security policies to received information packets, the system comprising:
    a processing resource;
    a non-transitory computer readable medium coupled to the processing resource and having stored therein instructions that when executed by the processing resource cause the processing resource to:
        access at least a first security policy and a second security policy, wherein the first security policy includes at least a first application criteria and the second security policy includes at least a second application criteria;
        correlate the first application criteria to a first subset of segments represented by a first bitmap, and the second application criteria to a second subset of segments represented by the first bitmap;
        determine that at least two segments represented by the first bitmap are correlated to the first security policy;
        form a second bitmap including bit locations that correspond to each of the at least two segments represented by the first bitmap; and associate only one of the bit locations in the second bitmap with a set of security policies for all of the at least two segments represented by the first bitmap that are correlated to the first security policy, wherein the set of security policies includes at least the first security policy.

12. The system of claim 11, wherein the non-transitory computer readable medium having stored therein instructions that when executed by the processing resource further cause the processing resource to:

identify the second security policy as a common security policy based at least in part on the second application criteria; and associate a common bit location in the first bitmap with the second security policy.

13. The system of claim 12, wherein the second application criteria extends into at least three segments represented by the first bitmap.

14. The system of claim 11, wherein the first application criteria is selected from a group consisting of: a source address, and a destination address.

15. The system of claim 11, wherein the at least two segments represented by the first bitmap determined to be correlated to the first security policy are continuous segments.

16. The system of claim 11, wherein the first subset of segments represented by the first bitmap and the second subset of segments represented by the first bitmap are along a dimension represented by the first bitmap, and wherein the non-transitory computer readable medium having stored therein instructions that when executed by the processing resource further cause the processing resource to:

partition the first bitmap along the dimension to yield the segments represented by the first bitmap.

17. The system of claim 16, wherein a number of segments is selected to reduce a number of security policies extending beyond one segment.

18. The system of claim 11, wherein the set of security policies is a first set of security policies, wherein the first security policy includes a third application criteria and the second security policy includes a fourth application criteria, and wherein the non-transitory computer readable medium having stored therein instructions that when executed by the processing resource further cause the processing resource to:

correlate the third application criteria to a third subset of segments represented by a third bitmap, and the fourth application criteria to a fourth subset of segments represented by the third bitmap;

determine that at least two segments represented by the third bitmap are correlated to the first security policy;

form a fourth bitmap including bit locations that correspond to each of the at least two segments represented by the third bitmap; and associate only one of the bit locations in the fourth bitmap with a second set of security policies for all of the at least two segments represented by the third bitmap that are correlated to the first security policy, wherein the second set of security policies includes at least the first security policy.

19. A non-transitory computer readable medium having stored therein instructions that when executed by a processing resource cause the processing resource to:

access at least a first security policy and a second security policy, wherein the first security policy includes at least a first application criteria and the second security policy includes at least a second application criteria;

correlate the first application criteria to a first subset of segments represented by a first bitmap, and the second application criteria to a second subset of segments represented by the first bitmap;

determine that at least two segments represented by the first bitmap are correlated to the first security policy;

form a second bitmap including bit locations that correspond to each of the at least two segments represented by the first bitmap; and associate only one of the bit locations in the second bitmap with a set of security policies for all of the at least two segments represented by the first bitmap that are correlated to the first security policy, wherein the set of security policies includes at least the first security policy.

20. Then non-transitory computer readable medium of claim 19, wherein the non-transitory computer readable medium having stored therein instructions that when executed by the processing resource further cause the processing resource to:

identify the second security policy as a common security policy based at least in part on the second application criteria; and associate a common bit location in the first bitmap with the second security policy.

21. Then non-transitory computer readable medium of claim 19, wherein the first subset of segments represented by the first bitmap and the second subset of segments represented by the first bitmap are along a dimension represented by the first bitmap, and wherein the non-transitory computer readable medium having stored therein instructions that when executed by the processing resource further cause the processing resource to:

partition the first bitmap along the dimension to yield the segments represented by the first bitmap.

22. The non-transitory computer readable medium of claim 19, wherein the set of security policies is a first set of security policies, wherein the first security policy includes a third application criteria and the second security policy includes a fourth application criteria, and wherein then non-transitory computer readable medium having stored therein instructions that when executed by the processing resource further cause the processing resource to:

correlate the third application criteria to a third subset of segments represented by a third bitmap, and the fourth application criteria to a fourth subset of segments represented by the third bitmap;

determine that at least two segments represented by the third bitmap are correlated to the first security policy;

form a fourth bitmap including bit locations that correspond to each of the at least two segments represented by the third bitmap; and associate only one of the bit locations in the fourth bitmap with a second set of security policies for all of the at least two segments represented by the third bitmap that are correlated to the first security policy, wherein the second set of security policies includes at least the first security policy.

* * * * *